United States Patent
Welton et al.

(10) Patent No.: US 7,727,935 B2
(45) Date of Patent: *Jun. 1, 2010

(54) DUAL-FUNCTION ADDITIVES FOR ENHANCING FLUID LOSS CONTROL AND STABILIZING VISCOELASTIC SURFACTANT FLUIDS

(75) Inventors: Thomas D. Welton, Duncan, OK (US); David E. McMechan, Duncan, OK (US); Jason E. Bryant, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 558 days.

This patent is subject to a terminal disclaimer.

(21) Appl. No.: 11/648,019

(22) Filed: Dec. 29, 2006

(65) Prior Publication Data

US 2009/0305913 A1    Dec. 10, 2009

(51) Int. Cl.
    *C09K 8/60*    (2006.01)
(52) U.S. Cl. .................... 507/203; 507/267
(58) Field of Classification Search ........... 507/267, 507/206
    See application file for complete search history.

(56) References Cited

U.S. PATENT DOCUMENTS

| | | | |
|---|---|---|---|
| 3,333,634 A * | 8/1967 | Townsend et al. ......... 166/270.1 |
| 3,410,343 A * | 11/1968 | Abdo ......................... 166/401 |
| 5,582,249 A | 12/1996 | Caveny et al. |
| 5,775,425 A | 7/1998 | Weaver et al. |
| 5,787,986 A | 8/1998 | Weaver et al. |
| 5,833,000 A | 11/1998 | Weaver et al. |
| 5,839,510 A | 11/1998 | Weaver et al. |
| 5,853,048 A | 12/1998 | Weaver et al. |
| 5,871,049 A | 2/1999 | Weaver et al. |
| 5,879,699 A | 3/1999 | Lerner ........................ 424/440 |
| 5,897,699 A | 4/1999 | Chatterji et al. |
| 6,047,772 A | 4/2000 | Weaver et al. |
| 6,063,738 A | 5/2000 | Chatterji et al. ............. 507/269 |
| 6,209,643 B1 | 4/2001 | Nguyen et al. |
| 6,258,859 B1 | 7/2001 | Dahayanake et al. |
| 6,419,017 B1 | 7/2002 | Metcalf et al. |
| 6,439,309 B1 | 8/2002 | Matherly et al. |
| 6,547,871 B2 | 4/2003 | Chatterji et al. ............. 106/672 |
| 6,637,517 B2 | 10/2003 | Samuel et al. |
| 6,881,702 B2 | 4/2005 | Arnold et al. |
| 6,881,709 B2 | 4/2005 | Nelson et al. |
| 7,159,659 B2 | 1/2007 | Welton et al. |
| 7,299,874 B2 | 11/2007 | Welton et al. |
| 7,303,019 B2 | 12/2007 | Welton et al. |
| 7,373,977 B1 * | 5/2008 | Berger et al. ............. 166/270.1 |
| 2004/0176478 A1 | 9/2004 | Dahayanake et al. |
| 2005/0059558 A1 | 3/2005 | Blauch et al. |
| 2005/0092489 A1 | 5/2005 | Welton et al. |
| 2005/0274517 A1 | 12/2005 | Blauch et al. |
| 2006/0063681 A1 | 3/2006 | Christanti et al. ........... 507/203 |
| 2006/0180309 A1 | 8/2006 | Welton et al. |
| 2006/0180310 A1 | 8/2006 | Welton et al. |
| 2006/0183646 A1 | 8/2006 | Welton et al. |
| 2006/0211775 A1 | 9/2006 | Crews ........................ 516/109 |
| 2006/0211776 A1 * | 9/2006 | Crews ........................ 516/194 |
| 2007/0007010 A1 | 1/2007 | Welton et al. |
| 2007/0213232 A1 * | 9/2007 | Hartshorne et al. ......... 507/237 |
| 2008/0161207 A1 | 7/2008 | Welton et al. |
| 2008/0161210 A1 | 7/2008 | Welton et al. |
| 2008/0161212 A1 | 7/2008 | Welton |
| 2009/0143256 A1 | 6/2009 | Welton |

FOREIGN PATENT DOCUMENTS

GB    2406863 A    4/2005

OTHER PUBLICATIONS

Search Report and Written Opinion for International Application No. PCT/GB2007/004710, Dec. 10, 2007.
U.S. Appl. No. 11/058,660, filed Feb. 15, 2005, Welton et al.
U.S. Appl. No. 11/058,475, filed Feb. 15, 2005, Welton et al.
U.S. Appl. No. 11/058,612, filed Feb. 15, 2005, Welton et al.
U.S. Appl. No. 11/058,611, filed Feb. 15, 2005, Welton et al.
Office Action from U.S. Appl. No. 11/647,743, dated Jun. 11, 2009.
Office Action from U.S. Appl. No. 11/647,743, dated Mar. 19, 2008.
Office Action from U.S. Appl. No. 11/647,743, dated Oct. 21, 2008.
Office Action from U.S. Appl. No. 11/648,441, dated Jul. 10, 2009.

(Continued)

*Primary Examiner*—Randy Gulakowski
*Assistant Examiner*—Alicia M Toscano
(74) *Attorney, Agent, or Firm*—Robert A. Kent

(57) ABSTRACT

Among many things, in some embodiments, dual-function additives that enhance fluid loss control and the stability of viscoelastic surfactant fluids, and their associated methods of use in subterranean formations, are provided. In one embodiment, the methods comprise: providing a viscoelastic surfactant fluid that comprises an aqueous base fluid, a viscoelastic surfactant, and a dual-function additive that comprises a soap component; and introducing the viscoelastic surfactant fluid into at least a portion of a subterranean formation.

14 Claims, No Drawings

OTHER PUBLICATIONS

Notice of Allowance from U.S. Appl. No. 11/647,605, dated Sep. 2, 2009.

Notice of Allowance and Notice of Allowability for U.S. Appl. No. 11/647,605 dated Dec. 28, 2009.

Office Action for U.S. Appl. No. 11/647,743 dated Jan. 28, 2010.

Schlumberger Article, ClearFRAC CO2 Surfactant, Apr. 2005.

Schlumberger Article, ClearFRAC EF Surfactant, Apr. 2005.

Schlumberger Article, ClearFRAC HiPerm Polymer-Free Fracturing Fluid for High-Permeability Reservoirs, Aug. 2005.

Schlumberger Article, ClearFRAC HT Surfactant, Apr. 2005.

Schlumberger Article, ClearFRAC Polymer-Free Fracturing Fluid, Apr. 2005.

Schlumberger Article, ClearFRAC Polymer-Free Fracturing Fluids, Apr. 2005.

Schlumberger Article, ClearPAC A Polymer-Free Gravel-Packing Fluid Family for Higher Productivity, May 2005.

Schlumberger Article, ClearPAC MS Polymer-Free Fluid for Simultaneous Gravel Packing and Mudcake Cleanup, May 2005.

Schlumberger Article, ClearPAC LT Polymer-Free Fluid for Low-Temperature Gravel Pack, May 2005.

Schlumberger Article, ClearPAC HD Polymer-Free Fluid for HIgh-Density Gravel Pack, May 2005.

Ai-Ghamdi, AbdulWahab et al., "Impact of Acid Additives on the Rheological Properties of Viscoelastic Surfactants and Their Influence on Field Application," Society of Petroleum Engineers, SPE 89418, Apr. 17, 2004.

Schlumberger Article, VDA Viscoeleastic Diverting Acid, Aug. 2002.

Notice of Allowance and Notice of Allowability from U.S. Appl. No. 11/647,605 dated Feb 18, 2010.

* cited by examiner

DUAL-FUNCTION ADDITIVES FOR ENHANCING FLUID LOSS CONTROL AND STABILIZING VISCOELASTIC SURFACTANT FLUIDS

CROSS-REFERENCE TO RELATED APPLICATIONS

The present invention is related to co-pending U.S. patent application Ser. No. 11/647,605, entitled "Dual-Function Additives for Enhancing Fluid Loss Control and Stabilizing Viscoelastic Surfactant Fluids," filed concurrently herewith, the entire disclosure of which is incorporated herein by reference.

BACKGROUND

The present invention relates to viscoelastic surfactant fluids useful in subterranean operations, and more particularly, to dual-function additives that enhance fluid loss control and the stability of viscoelastic surfactant fluids, and their associated methods of use.

Treatment fluids may be used in a variety of subterranean treatments, including, but not limited to, stimulation treatments and sand control treatments. As used herein, the term "treatment," or "treating," refers to any subterranean operation that uses a fluid in conjunction with a desired function and/or for a desired purpose. The terms "treatment," and "treating," as used herein, do not imply any particular action by the fluid or any particular component thereof. These subterranean operations include, but are not limited to, hydraulic fracturing treatments, acidizing treatments, gravel-packing treatments, sand control treatments, and the like.

Maintaining sufficient viscosity in the treatment fluids used in these operations is important for a number of reasons. Maintaining sufficient viscosity is important in fracturing and sand control treatments for particulate transport and/or to create or enhance fracture width. Also, maintaining sufficient viscosity may be important to control and/or reduce fluid loss into the formation. At the same time, while maintaining sufficient viscosity of the treatment fluid often is desirable, it may also be desirable to maintain the viscosity of the treatment fluid in such a way that the viscosity also may be reduced easily at a particular time, inter alia, for subsequent recovery of the fluid from the formation.

To provide the desired viscosity, polymeric gelling agents commonly are added to the treatment fluids. The term "gelling agent" is defined herein to include any substance that is capable of increasing the viscosity of a fluid, for example, by forming a gel. Examples of commonly used polymeric gelling agents include, but are not limited to, guar gums and derivatives thereof, cellulose derivatives, biopolymers, and the like. To further increase the viscosity of a treatment fluid, often the polymeric gelling agent is crosslinked with the use of a crosslinking agent. Treatment fluids comprising crosslinked gelling agents also may exhibit elastic and/or viscoelastic properties, wherein the crosslinks between gelling agent molecules may be broken and reformed, allowing the viscosity of the fluid to vary with certain conditions such as temperature, pH, and the like.

The use of polymeric gelling agents, however, may be problematic. For instance, polymeric gelling agents may leave an undesirable gel residue in the subterranean formation after use, which can impact permeability of the formation. As a result, costly remedial operations may be required to clean up the fracture face and proppant pack. Foamed treatment fluids and emulsion-based treatment fluids have been employed to minimize residual damage, but increased expense and complexity often have resulted.

To combat perceived problems associated with polymeric gelling agents, some surfactants have been used as gelling agents. It is well understood that, when mixed with a fluid in a concentration above the critical micelle concentration, the molecules (or ions) of surfactants may associate to form micelles. The term "micelle" is defined to include any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure. These micelles may function, among other purposes, to stabilize emulsions, break emulsions, stabilize a foam, change the wettability of a surface, solubilize certain materials, and/or reduce surface tension.

When used as a gelling agent, the molecules (or ions) of the surfactants associate to form micelles of a certain micellar structure (e.g., rodlike, wormlike, vesicles, etc., which are referred to herein as "viscosifying micelles") that, under certain conditions (e.g., concentration, ionic strength of the fluid, etc.) are capable of, inter alia, imparting increased viscosity to a particular fluid and/or forming a gel. Certain viscosifying micelles may impart increased viscosity to a fluid such that the fluid exhibits viscoelastic behavior (e.g., shear thinning properties) due, at least in part, to the association of the surfactant molecules contained therein. As used herein, the term "viscoelastic surfactant" refers to surfactants that impart or are capable of imparting viscoelastic behavior to a fluid due, at least in part, to the association of surfactant molecules to form viscosifying micelles. Moreover, because the viscosifying micelles may be sensitive to hydrocarbons, the viscosity of these surfactant fluids may be reduced after introduction into the subterranean formation without the need for certain types of gel breakers (e.g., oxidizers). The term "breaker" is defined herein to include any substance that is capable of decreasing the viscosity of a fluid. This may allow a substantial portion of the surfactant fluids to be produced back from the formation without the need for expensive remedial treatments. Moreover, these viscoelastic surfactants may not leave the undesirable gel residue in the subterranean formation found in uses of polymeric gelling agents, reducing or alleviating the need for costly remedial operations.

However, the use of viscoelastic surfactant fluids may be problematic in certain subterranean formations exhibiting high temperatures (e.g., above about 200° F.). Many viscoelastic surfactant fluids become unstable at these temperatures, which reduces the viscosity of the fluid. Moreover, the stability of viscosifying micelles in viscoelastic surfactant fluids may be extremely sensitive to various conditions (e.g., temperature, pH, presence of other additives in the fluid, composition of the subterranean formation, etc.), and thus the inclusion of other additives in the viscoelastic surfactant fluid that are needed for a given treatment using that fluid may detrimentally affect the rheological properties (e.g., viscosity) of the fluid. This inability to maintain a desired level of viscosity at higher temperatures, among other problems, may increase fluid loss and decrease the ability of the fluid to suspend and/or transport particulate materials.

Numerous additives are used in the art to help control fluid loss in subterranean operations. Numerous additives are also used in the art to maintain stability and/or viscosity of a treatment fluid at higher temperatures. However, the use of these conventional additives may give rise to other problems. First, the necessity of both a fluid loss control additive and a separate stabilizing or viscosifying additive in a treatment fluid may increase the complexity and cost of a treatment fluid and/or a subterranean application utilizing that fluid. Moreover, many conventional fluid loss control additives permanently reduce the permeability of a subterranean formation, affect the rheology of the treatment fluid in which they are used, and/or reduce the rate at which the fluid is allowed to penetrate or leak off into the subterranean formation. However, in some instances, while it may be desirable to control or prevent fluid loss for a given period of time, it may become desirable to allow the treatment fluid to penetrate or leak off into the subterranean formation, or to increase the permeability of the subterranean formation, at some later point in time. Costly and time-consuming operations may be required to reverse the effects of conventional fluid loss control additives on the treatment fluid and/or to restore permeability to those portions of the subterranean formation affected by the fluid loss control additives.

SUMMARY

The present invention relates to viscoelastic surfactant fluids useful in subterranean operations, and more particularly, to dual-function additives that enhance fluid loss control and the stability of viscoelastic surfactant fluids, and their associated methods of use.

In one embodiment, the present invention provides a method comprising: providing a viscoelastic surfactant fluid that comprises an aqueous base fluid, a viscoelastic surfactant, and a dual-function additive that comprises a soap component; and introducing the viscoelastic surfactant fluid into at least a portion of a subterranean formation.

In another embodiment, the present invention provides a method of stabilizing the viscosity of a viscoelastic surfactant fluid and controlling fluid loss in a subterranean formation comprising: providing the viscoelastic surfactant fluid that comprises an aqueous base fluid, a viscoelastic surfactant, and a soap component; introducing the viscoelastic surfactant fluid into at least a portion of the subterranean formation; and allowing the soap component to provide effective amounts of viscosity in the viscoelastic surfactant fluid and fluid loss control in at least a portion of the subterranean formation.

In another embodiment, the present invention provides a method of treating a subterranean formation comprising: providing a viscoelastic surfactant fluid that comprises an aqueous base fluid, a viscoelastic surfactant, and a dual-function additive that comprises a soap component; and introducing the viscoelastic surfactant fluid into at least a portion of the subterranean formation wherein the temperature in at least a portion of the subterranean formation is above about 200° F.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to viscoelastic surfactant fluids useful in subterranean operations, and more particularly, to dual-function additives that enhance fluid loss control and the stability of viscoelastic surfactant fluids, and their associated methods of use.

The viscoelastic surfactant fluids of the present invention generally comprise an aqueous base fluid, a viscoelastic surfactant, and a dual-function additive that comprises one or more soap components. As used herein, the term "dual-function additive" refers to a single additive that may be added to a viscoelastic surfactant fluid to perform two different functions and/or impart two different properties or characteristics to that viscoelastic surfactant fluid. The term "soap component" is defined herein to include salts of carboxylic acids (which are referred to herein as "soaps"), free carboxylic acids, derivatives thereof, and combinations thereof. The term "viscoelastic surfactant" is defined herein to include any surfactant that imparts or is capable of imparting viscoelastic behavior to a fluid due, at least in part, to the association of surfactant molecules to form viscosifying micelles. The term "viscoelastic surfactant fluid" is defined herein to include any fluid that exhibits or is capable of exhibiting viscoelastic behavior due, at least in part, to the association of surfactant molecules contained therein to form micelles.

The dual-function additives used in the present invention may, among other things, impact effective or sufficient levels of fluid loss control, stability, and/or viscosity to a viscoelastic surfactant fluid suitable for use in particular subterranean applications, especially at higher temperatures (e.g., above about 200° F.). In certain embodiments, these dual-function additives may, among other things, provide both enhanced fluid loss control and enhanced stability with a single step or additive, which may reduce or alleviate the need for multiple steps or additives to provide both of these advantages. In fact, in certain embodiments, the treatment fluids of the present invention may be substantially free of other fluid loss control additives and/or gel stabilizers. In certain embodiments, at some point during the methods of the present invention (e.g., before the viscoelastic surfactant fluid is introduced into a subterranean formation), at least a portion of the soap component is dissolved in the viscoelastic surfactant fluid and at least a portion of the soap component is not dissolved in the viscoelastic surfactant fluid. As used herein, a portion of the soap component that is "not dissolved" in the viscoelastic surfactant fluid refers to a portion of the soap component that is mixed into the viscoelastic surfactant fluid, but is present in a separate phase (e.g., a solid phase) from that of the rest of the viscoelastic surfactant fluid. In certain embodiments, substantially all of the soap component in the viscoelastic surfactant fluid may be allowed to dissipate and/or dissolve into the viscoelastic surfactant fluid at some point in time during the methods of the present invention. This may, among other things, allow the viscosity of the viscoelastic surfactant fluid to be reduced and/or allow for a more complete removal of the fluid loss agents.

The soap components that are used in the present invention may comprise any soap or carboxylic acid known in the art, derivatives thereof, or combinations thereof. The term "derivative" is defined herein to include any compound that is made from one of the listed compounds, for example, by replacing one atom in one of the listed compounds with another atom or group of atoms, ionizing one of the listed compounds, or creating a salt of one of the listed compounds. In certain embodiments, the soap component may comprise a solution of one or more carboxylic acids in combination with one or more soaps or salts of carboxylic acids. In conventional usage in the art, the term "soap" sometimes may be understood to include only the salts of "fatty acids" (i.e., "long-chain" carboxylic acids, a term that is defined herein to refer to carboxylic acids that comprise about 10-30 carbons). In the present invention, the term "soap" refers to a salt of any carboxylic acid, regardless of the length of the hydrocarbon chain. Thus, for the purposes of this invention, the term "soap" includes salts of fatty acids that are conventionally referred to as soaps, and also includes the salts of non-long-chain carboxylic acids. Similarly, the carboxylic acids used as the soap component may comprise long-chain carboxylic acids (e.g., "fatty acids") or any other carboxylic acid known in the art.

Examples of soaps suitable for use in the soap component include, but are not limited to, sodium stereate, potassium stereate, ammonium stereate, sodium oleate, potassium oleate, ammonium oleate, sodium laurate, potassium laurate, sodium myristate, potassium myristate, sodium ricinoleate, potassium ricinoleate, sodium palmitate, potassium palmitate, calcium caprylate, sodium caprylate, potassium caprylate, sodium behenate, potassium behenate, ammonium behenate, combinations thereof, and the like. Examples of carboxylic acids that may be suitable for use in the soap component include, but are not limited to, 4,7,10,13,16,19-docosahexaenoic acid, 4,7,10,13,16-docosapentaenoic acid, 5,8,11,14,17-eicosapentaenoic acid, 5,8,11,14-eicosatetraenoic acid, 5,8,11-eicosatrienoic acid, 6,9,12,15-octadecatetraenoic acid, 7,10,13,16,19-docosapentaenoic acid, 7,10,13,16-docosatetraenoic acid, 8,11,14,17-eicosatetraenoic acid, 8,11,14-eicosatrienoic acid, behenic acid, capric acid, caprylic acid, cis-11-docosenoic acid, cis-11-eicosenoic acid, cis-11-octadecenoic acid, cis-15-tetracosenoic acid, cis-4-decenoic acid, cis-4-dodecenoic acid, cis-4-tetradecenoic acid, cis-5-lauroleic acid, cis-5-tetradecenoic acid, cis-6-octadecenoic acid, cis-9-decenoic acid, cis-9-dodecenoic acid, cis-9-eicosenoic acid, cis-9-hexadecenoic acid, cis-9-tetradecenoic, cis-tetracosenoic acid, caprylic acid decenoic acid, dihydroxystearic acid, docosadienoic acid, docosahexaenoic acid, docosapentaenoic acid, dotriacontanoic acid, eicosadienoic acid, eicosanoic acid, eicosapentaenoic acid, eicosatetraenoic acid, eicosatrienoic acid, eicosenoic acid, erucic acid, heptadecanoic acid, heptadecenoic acid, hexacosanoic acid, hexadecadienoic acid, hexadecenoic acid, lauric acid, linoleic acid, linolenic, myristic acid, nonadecanoic acid, nonanoic acid, octacosanoic acid, octadecatetraenoic acid, octadecatrienoic acid, oleic acid, palmitic acid, pentadecanoic acid, pentadecenoic acid, pentatriacontanoic, ricinoleic acid, stearic acid, tetracosanoic acid, tetradecenoic acid, tetratriacontanoic acid, triacontanoic acid, tridecanoic acid, tritriacontanoic acid, combinations thereof, derivatives thereof, and the like. The soap or soap component also may be combination of fatty acids made from numerous sources including but limited to animal fats, marine fats, vegetable oils and fats, butter, canola oil, castor oil, coco butter coconut oil, corn oil, cotton seed oil, crambe oil, herrings, lard, linseed oil, menhaden, olive oil, palm kernel oil, peanut oil, plam oil, rape seed oil, safflower oil, sardines, soybean oil, sunflower oil, tall oil, tallow, tung oil, yellow grease, combinations thereof, and the like. Any combination of the soaps and/or carboxylic acids listed above also may be included in the viscoelastic surfactant fluid of the present invention. The types of soaps and/or carboxylic acids suitable for use in a particular application of the present invention may depend upon a variety of factors, such as the type(s) of viscoelastic surfactant(s) present in the viscoelastic surfactant fluid, the composition of the aqueous-base fluid, the temperature of the fluid, and the like. A person of ordinary skill, with the benefit of this disclosure, will recognize the appropriate types of soaps and/or carboxylic acids to include in the soap component in a particular application of the present invention.

The soap component may be present in any amount that is sufficient to provide the desired level of fluid loss control and/or viscosity in the viscoelastic surfactant fluid. In certain embodiments, the soap component may be present in an amount above about 2 pounds per thousand gallons of the viscoelastic surfactant fluid. In certain embodiments, the soap component may be present in an amount above about 15 pounds per thousand gallons of the viscoelastic surfactant fluid. In certain embodiments, the soap component may be present in an amount above about 40 pounds per thousand gallons of the viscoelastic surfactant fluid. In certain embodiments, the portion of the soap component that is not dissolved in the viscoelastic surfactant fluid may be present in an amount above about 5 pounds per thousand gallons of the viscoelastic surfactant fluid. In certain embodiments, the portion of the soap component that is not dissolved in the viscoelastic surfactant fluid may be present in an amount in the range of from about 10 pounds to about 30 pounds per thousand gallons of the viscoelastic surfactant fluid. The amount of the soap component (in total and the portion that is not dissolved) suitable for use in a particular application of the present invention may depend upon a variety of factors, such as the type(s) of viscoelastic surfactant(s) present in the viscoelastic surfactant fluid, the composition of the aqueous-base fluid, the temperature of the fluid, and the like. A person of ordinary skill in the art, with the benefit of this disclosure, will be able to determine the appropriate amount of the soap component to include in a particular application of the present invention.

The viscoelastic surfactants in the viscoelastic surfactant fluids of the present invention may comprise any viscoelastic surfactant known in the art, any derivative thereof, or any combination thereof. As used herein, the term "viscoelastic surfactant" refers to a surfactant that imparts or is capable of imparting viscoelastic behavior to a fluid due, at least in part, to the association of surfactant molecules to form viscosifying micelles. These viscoelastic surfactants may be cationic, anionic, or amphoteric in nature. The viscoelastic surfactants may comprise any number of different compounds, including methyl ester sulfonates (e.g., as described in U.S. patent application Ser. Nos. 11/058,660, 11/058,475, 11/058,612, and 11/058,611, filed Feb. 15, 2005, the relevant disclosures of which are incorporated herein by reference), hydrolyzed keratin (e.g., as described in U.S. Pat. No. 6,547,871, the relevant disclosure of which is incorporated herein by reference), sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof.

Suitable viscoelastic surfactants may comprise mixtures of several different compounds, including but not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. Examples of suitable mixtures of an ethoxylated alcohol ether sulfate surfactant, an alkyl or alkene amidopropyl betaine surfactant, and an alkyl or alkene dimethylamine oxide surfactant are described in U.S. Pat. No. 6,063,738, the relevant disclosure of which is incorporated herein by reference. Examples of suitable aqueous solutions of an alpha-olefinic sulfonate surfactant and a betaine surfactant are described in U.S. Pat. No. 5,879,699, the relevant disclosure of which is incorporated herein by reference.

Examples of commercially-available viscoelastic surfactants suitable for use in the present invention may include, but are not limited to, Mirataine BET-O 30™ (an oleamidopropyl betaine surfactant available from Rhodia Inc., Cranbury, N.J.), Aromox APA-T (amine oxide surfactant available from Akzo Nobel Chemicals, Chicago, Ill.), Ethoquad O/12 PG™ (a fatty amine ethoxylate quat surfactant available from Akzo Nobel Chemicals, Chicago, Ill.), Ethomeen T/12™ (a fatty amine ethoxylate surfactant available from Akzo Nobel Chemicals, Chicago, Ill.), Ethomeen S/12™ (a fatty amine ethoxylate surfactant available from Akzo Nobel Chemicals, Chicago, Ill.), and Rewoteric AM TEG™ (a tallow dihydroxyethyl betaine amphoteric surfactant available from Degussa Corp., Parsippany, N.J.).

The viscoelastic surfactant should be present in a viscoelastic surfactant fluid of the present invention in an amount sufficient to impart the desired viscosity (e.g., sufficient viscosity to divert flow, reduce fluid loss, suspend particulates, etc.) to the viscoelastic surfactant fluid. In certain embodiments, the viscoelastic surfactant may be present in the viscoelastic surfactant fluid in an amount in the range of from about 0.1% to about 20% by weight of the viscoelastic surfactant fluid. In certain embodiments, the viscoelastic surfactant may be present in an amount in the range of from about 1% to about 10% by weight of the viscoelastic surfactant fluid. In certain embodiments, the viscoelastic surfactant may be present in an amount in the range of from about 1.5% to about 5% by weight of the viscoelastic surfactant fluid.

The aqueous base fluids used in the viscoelastic surfactant fluids of the present invention may comprise fresh water, saltwater (e.g., water containing one or more salts dissolved therein), brine, seawater, or combinations thereof. Generally, the water may be from any source, provided that it does not contain components that might adversely affect the stability and/or performance of the viscoelastic surfactant fluids of the present invention. In certain embodiments, the density of the aqueous base fluid can be adjusted, among other purposes, to provide additional particle transport and suspension in the viscoelastic surfactant fluids of the present invention. In certain embodiments, the pH of the aqueous base fluid may be adjusted (e.g., by a buffer or other pH adjusting agent), among other purposes, to reduce the viscosity of the viscoelastic surfactant fluid (e.g., activate a breaker or other additive). In these embodiments, the pH may be adjusted to a specific level, which may depend on, among other factors, the type(s) of viscoelastic surfactant(s), soap component, gelling agents, acids, and other additives included in the viscoelastic surfactant fluid. One of ordinary skill in the art, with the benefit of this disclosure, will recognize when such density and/or pH adjustments are appropriate.

The viscoelastic surfactant fluids used in methods of the present invention optionally may comprise any number of additional additives, including, but not limited to, salts, co-surfactants, acids, additional fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, relative permeability modifiers, resins, particulate materials (e.g., proppant particulates), wetting agents, coating enhancement agents, and the like. A person skilled in the art, with the benefit of this disclosure, will recognize the types of additives that may be included in the viscoelastic surfactant fluids for a particular application.

For example, the viscoelastic surfactant fluids of the present invention optionally may comprise one or more salts, among other purposes, to modify the rheological properties (e.g., viscosity) of the viscoelastic surfactant fluid. The salts may be organic or inorganic. Examples of suitable organic salts include but are not limited to aromatic sulfonates and carboxylates (such as p-toluene sulfonate, naphthalene sulfonate), hydroxynaphthalene carboxylates, salicylate, phthalate, chlorobenzoic acid, salicylic acid, phthalic acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, trimethylammonium hydrochloride and tetramethylammonium chloride. Examples of suitable inorganic salts include water-soluble potassium, sodium, and ammonium salts, (such as sodium chloride, potassium chloride, and ammonium chloride), calcium chloride, calcium bromide, magnesium chloride and zinc halide salts. Examples of viscoelastic surfactant fluids comprising salts suitable for use in the present invention are described in U.S. patent application Ser. No. 10/800,478, the relevant disclosure of which is incorporated herein by reference. Any combination of the salts listed above also may be included in the viscoelastic surfactant fluids of the present invention.

When used, the salt may be present in any amount that imparts the desired stability and/or other rheological properties to the viscoelastic surfactant fluid of the present invention. In certain embodiments, the salt may be present in an amount in the range of from about 0.1% to about 30% by weight of the viscoelastic surfactant fluid. In certain embodiments, the salt may be present in an amount in the range of from about 0.1% to about 10% by weight of the viscoelastic surfactant fluid. The type(s) and amount of salts suitable in a particular application of the present invention may depend upon a variety of factors, such as the type(s) of viscoelastic surfactant(s) present in the viscoelastic surfactant fluid, the composition of the aqueous-base fluid, the composition and/or amount of the soap component, the temperature of the fluid, and the like. A person of ordinary skill, with the benefit of this disclosure, will recognize when to include a salt in a particular application of the present invention, as well as the appropriate type and amount of salts to include.

Generally, the methods of the present invention comprise: providing a viscoelastic surfactant fluid that comprises an aqueous base fluid, a viscoelastic surfactant, and a dual-function additive that comprises a soap component; and introducing the viscoelastic surfactant fluid into at least a portion of a subterranean formation. The dual-function additives and viscoelastic surfactant fluids of the present invention and/or any component thereof (e.g., the soap component) may be provided in any form that is suitable for the particular application of the present invention. In certain embodiments, the dual-function additives of the present invention may be provided as a liquid and/or solid additive that is admixed or incorporated into a viscoelastic surfactant fluid used in conjunction with the present invention at any point prior to and/or during use. The different components of the dual-function additives and/or viscoelastic surfactant fluids of the present invention may be provided and/or incorporated together (e.g., in the same additive or fluid), and/or they may be provided and/or incorporated into a viscoelastic surfactant fluid as separate additives. Where they are provided and/or incorporated into a viscoelastic surfactant fluid separately, the different components may be provided and/or incorporated simultaneously, or certain components may be provided and/or incorporated at some point in time before or after the other components are provided and/or incorporated. In certain embodiments, the dual-function additives of the present invention may be present on the surface of one or more particulates (e.g., proppant particulates, gravel particulates) that are included in the viscoelastic surfactant fluid and/or that the viscoelastic surfactant fluid interacts with in the course of a subterranean operation. For example, the dual-function additives of the present invention may be provided as a coating or partial coating on the particulates. For example, the dual-function additives of the present invention may be provided as a coating on one or more particulates, and a viscoelastic surfactant fluid may be allowed to contact at least a plurality of those particulates such that the dual-function additives interact with the fluid, among other possible results, to impart desired properties (e.g., viscosity, stability, fluid loss control) to the fluid.

The dual-function additives and viscoelastic surfactant fluids of the present invention and/or any component thereof may be prepared at a job site, or they may be prepared at a plant or facility prior to use, and may be stored for some period of time prior to use. In certain embodiments, the preparation of these dual-function additives and viscoelastic surfactant fluids of the present invention may be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

The methods and viscoelastic surfactant fluids of the present invention may be used during or in preparation for any subterranean operation wherein a fluid may be used. Suitable subterranean operations may include, but are not limited to, preflush treatments, afterflush treatments, drilling operations, hydraulic fracturing treatments, sand control treatments (e.g., gravel packing), acidizing treatments (e.g., matrix acidizing or fracture acidizing), "frac-pack" treatments, well bore clean-out treatments, and other operations where a viscoelastic surfactant fluid of the present invention may be useful. For example, in certain embodiments, the present invention provides fracturing fluids that comprise an aqueous base fluid, a viscoelastic surfactant, a dual-function additive that comprises a soap component, and, in certain embodiments, a plurality of proppant particulates. In certain embodiments, a viscoelastic surfactant fluid or fracturing fluid of the present invention may be used in a method of fracturing a subterranean formation, wherein a viscoelastic surfactant fluid or fracturing fluid of the present invention is introduced into the subterranean formation at or above a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. This may, among other things, form conductive channels in the subterranean formation through which fluids (e.g., oil, gas, etc.) may flow to a well bore penetrating the subterranean formation.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While numerous changes may be made by those skilled in the art, such changes are encompassed within the spirit of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:

providing a viscoelastic surfactant fluid that comprises an aqueous fluid, a viscoelastic surfactant selected from the group consisting of methyl ester sulfonates, hydrolyzed keratin, taurates, amine oxides, ethoxylated amides, alkoxylated fatty acids, alkoxylated alcohols, ethoxylated fatty amines, ethoxylated alkyl amines and combinations thereof, and a dual-function additive that comprises about 2 pounds to about 30 pounds per thousand gallons of a soap component selected from the group consisting of sodium stearate, potassium stearate, ammonium stearate, sodium laurate, potassium laurate, sodium myristate, potassium myristate, sodium palmitiate, potassium palmitiate, calcium caprylate, sodium caprylate, potassium caprylate, sodium behenate, potassium behenate, ammonium behenate, behenic acid, capric acid, caprylic acid, dihydroxystearic acid, dotriacontanoic acid, eicosanoic acid, heptadecanoic acid, hexacosanoic acid, lauric acid, myristic acid, nonadecanoic acid, nonanoic acid, octacosanoic acid, palmitic acid, pentadecanoic acid, pentatriacontanoic acid, stearic acid, tetracosanoic acid, tetratricontanoic acid, tricontanoic acid, tridecanoic acid, tritriacontanoic acid and combinations thereof; and introducing the viscoelastic surfactant fluid into at least a portion of a subterranean formation.

2. The method of claim 1 wherein at least a portion of the soap component is dissolved in the viscoelastic surfactant fluid, and at least a portion of the soap component is not dissolved in the viscoelastic surfactant fluid.

3. The method of claim 2 wherein the portion of the soap component that is dissolved in the viscoelastic surfactant fluid is present in an amount sufficient to impart an effective level of viscosity to the viscoelastic surfactant fluid.

4. The method of claim 2 wherein the portion of the soap component that is not dissolved in the viscoelastic surfactant fluid is present in an amount sufficient to provide an effective amount of fluid loss control in at least a portion of the subterranean formation.

5. The method of claim 2 wherein the portion of the soap component that is not dissolved in the viscoelastic surfactant fluid is present in an amount above about 5 pounds per thousand gallons of the viscoelastic surfactant fluid.

6. The method of claim 1 wherein the temperature in at least a portion of the subterranean formation is above about 200° F.

7. The method of claim 1 further comprising allowing substantially all of the soap component in the viscoelastic surfactant fluid to dissipate and/or dissolve into the viscoelastic surfactant fluid.

8. The method of claim 1 wherein the viscoelastic surfactant fluid is substantially free of additional fluid loss control additives and/or gel stabilizers.

9. A method of stabilizing the viscosity of a viscoelastic surfactant fluid and controlling fluid loss in a subterranean formation comprising:

providing the viscoelastic surfactant fluid that comprises an aqueous base fluid, a viscoelastic surfactant selected from the group consisting of methyl ester sulfonates, hydrolyzed keratin, taurates, amine oxides, ethoxylated amides, alkoxylated fatty acids, alkoxylated alcohols, ethoxylated fatty amines, ethoxylated alkyl amines and combinations thereof, and about 2 pounds to about 30 pounds per thousand gallons of a soap component selected from the group consisting of sodium stearate, potassium stearate, ammonium stearate, sodium laurate, potassium laurate, sodium myristate, potassium myristate, sodium palmitate, potassium palmitiate, calcium caprylate, sodium caprylate, potassium caprylate, sodium behenate, potassium behenate, ammonium behenate, behenic acid, capric acid, caprylic acid, dihydroxystearic acid, dotriacontanoic acid, eicosanoic acid, heptadecanoic acid, hexacosanoic acid, lauric acid, myristic acid, nonadecanoic acid, nonanoic acid, octacosanoic acid, palmitic acid, pentadecanoic acid, pentatriacontanoic acid, stearic acid, tetracosanoic acid, tetratricontanoic acid, tricontanoic acid, tridecanoic acid, tritriacontanoic acid and combinations thereof introducing the viscoelastic surfactant fluid into at least a portion of the subterranean formation; and allowing the soap component to provide effective amounts of viscosity in the viscoelastic surfactant fluid and fluid loss control in at least a portion of the subterranean formation.

10. The method of claim 9 wherein the temperature in at least a portion of the subterranean formation is above about 200° F.

11. The method of claim 9 wherein at least a portion of the soap component is dissolved in the viscoelastic surfactant fluid, and at least a portion of the soap component is not dissolved in the viscoelastic surfactant fluid.

12. The method of claim 11 wherein the portion of the soap component that is not dissolved in the viscoelastic surfactant fluid is present in an amount above about 5 pounds per thousand gallons of the viscoelastic surfactant fluid.

13. A method of treating a subterranean formation comprising:

providing a viscoelastic surfactant fluid that comprises an aqueous base fluid, a viscoelastic surfactant selected from the group consisting of methyl ester sulfonates, hydrolyzed keratin, taurates, amine oxides, ethoxylated amides, alkoxylated fatty acids, alkoxylated alcohols, ethoxylated fatty amines, ethoxylated alkyl amines and combinations thereof, and a dual-function additive that comprises about 2 pounds to about 30 pounds per thousand gallons of a soap component selected from the group consisting of sodium stearate, potassium stearate, ammonium stearate, sodium laurate, potassium laurate, sodium myristate, potassium myristate, sodium palmitiate, potassium palmitiate, calcium caprylate, sodium caprylate, potassium caprylate, sodium behenate, potassium behenate, ammonium behenate, behenic acid, capric acid, caprylic acid, dihydroxystearic acid, dotriacontanoic acid, eicosanoic acid, heptadecanoic acid, hexacosanoic acid, lauric acid, myristic acid, nonadecanoic acid, nonanoic acid, octacosanoic acid, palmitic acid, pentadecanoic acid, pentatriacontanoic acid, stearic acid, tetracosanoic acid, tetratricontanoic acid, tricontanoic acid, tridecanoic acid, tritriacontanoic acid and combinations thereof; and introducing the viscoelastic surfactant fluid into at least a portion of the subterranean formation wherein the temperature in at least a portion of the subterranean formation is above about 200° F.

14. The method of claim 13 wherein at least a portion of the soap component is dissolved in the viscoelastic surfactant fluid, and at least a portion of the soap component is not dissolved in the viscoelastic surfactant fluid.

* * * * *